United States Patent Office 3,251,888
Patented May 17, 1966

3,251,888
PREPARATION OF GLYCOLS
William G. Toland, San Rafael, Calif., assignor to Chevron Research Company, a corporation of Delaware
No Drawing. Filed June 7, 1962, Ser. No. 200,628
5 Claims. (Cl. 260—618)

The present invention relates to a process for the preparation of glycols from ethylenically unsaturated hydrocarbons, such as mono-olefins. More particularly, the invention has to do with a process of preparing glycols involving the oxidation of the aforesaid hydrocarbons with boric acid or boric oxide and an organic hydroperoxide, such as cumene hydroperoxide. The glycols of the invention are useful in the preparation of alkyd resins and polyesters, as is known in the art.

In accordance with the invention, controlled oxidation of ethylenically unsaturated hydrocarbons, for example, acyclic and alicyclic mono-olefins of 4 to 16 carbon atoms, readily occurs to form the borate ester by heating the olefin and boric acid in the presence of cumene hydroperoxide. This borate ester is a useful product which may be thermally cracked, transesterified, or hydrolyzed to boric acid and glycol. The glycol is easily recovered and the boric acid is re-used if desired.

In carrying out the process of the invention, proportions of boric acid ranging from 0.05 to 1.5 mols, preferably 0.5 to 1.1 mols per mol of olefin are used. Proportions of cumene hydroperoxide on the other hand can range from 0.5 to 1.5 mols, preferably 0.5 to 1.1 mols per mol of boric acid.

In place of cumene hydroperoxide other organic peroxides in which the peroxy group is attached to tertiary carbon atom can be used. These include decalin hydroperoxide, pinane hydroperoxide, p-menthane hydroperoxide, cymene hydroperoxide, and p-chlorocumene hydroperoxide.

Reaction temperatures are such as to effect formation of the borate ester of the olefin, and temperatures sufficiently high to drive off water of reaction are satisfactory. In general, reaction temperatures can range from 60 to 200° C., preferably 80 to 120° C.

In the event low-boiling olefin is used, the process can be carried out under pressure to maintain the reaction mixture in liquid phase.

The use of a solvent is advantageous. The solvent provides better control of heat and mixing, and since the reaction involves the liberation of water, the use of an azeotropic solvent is particularly advantageous. A suitable solvent is one which is inert with regard to any of the reactants. An excess of the olefin used may also be employed as a solvent. Examples of suitable solvents are hydrocarbons, such as cyclohexane, cumene, benzene, hexane, heptane, and octane; halogenated solvents, such as chloroform and carbon tetrachloride.

When used, the amount of solvent employed can vary widely. As indicated, sufficient solvent is employed for the control of heat of reaction, and to expedite mixing and the removal of reaction water. Greater amounts can be employed, the only limitation being capacity of the reactor and inconvenience of handling large volumes of material. Proportions of solvent based on olefin range from 1 to 10, preferably 1 to 5, volumes for each volume of olefin are cited as illustrative. Following reaction, the solvent may be removed from the non-volatile glycol borate by distillation. It can also be extracted selectively. For example, lower molecular weight glycol esters can be extracted with water, which also hydrolyzes them to the free glycols and boric acid.

The following examples illustrate the practice of the invention. While cyclohexene, 1-dodecene, and 2-ethyl-1-hexene are taken as illustrative, it is apparent that other olefins, acyclic and alicyclic, are usable. These include straight and branched chain mono-olefins of four to sixteen carbon atoms, acyclic and alicyclic, starting from ethylene up to hexadecene; isobutylene, diisobutylene; hydrocarbon-substituted cyclohexenes; aromatic substituted ethylenes, such as styrene; and non-conjugated diolefins, such as 1,7-octadiene.

EXAMPLE 1

*Preparation of trans-1,2-dihydroxycyclohexane*

A three-necked, 500-ml. round bottom flask was fitted with a stirrer, dropping funnel, water separator, and condenser. To this flask there were charged 164 grams (2 mols) of 98 percent cyclohexene and 24.8 grams (0.4 mol) of boric acid. In the dropping funnel there were placed 70.5 grams of 86.2 percent cumene hydroperoxide in cumene (0.4 mol). The flask was heated by means of an electric mantle to the reflux temperature. The cumene hydroperoxide solution was then added dropwise over a period of 1.3 hours. The pot temperature rose from 83° C. to 88° C., and 1.6 ml. of water was collected in the separator. Refluxing was continued for an additional eight hours, during which time the temperature rose to 91° C. and 13.5 ml. more of water was collected (a total of 15.1 ml. of water).

The reaction mixture was filtered and the low boiling material was distilled through a short Vigreux column. The overhead from this distillation had the following analysis:

| Component | Grams | Mols |
|---|---|---|
| Cyclohexene | 129 | 1.64 |
| Acetophenone | 2.1 | 0.02 |
| α-Methylstyrene | 42.6 | 0.36 |
| α,α-Dimethylbenzyl Alcohol | 5.4 | 0.4 |
| Acetone | 0.4 | 0.007 |
| Phenol | 0.6 | 0.007 |

The bottoms from this distillation, 53.9 grams, were hydrolyzed by boiling with water for six hours. The hydrolyzed material was extracted continuously with chloroform. Upon evaporation of the chloroform, 20 grams of crude trans-1,2-dihydroxycyclohexane was obtained. This compound was identified by its infra-red spectrum. This spectrum is very distinctive in distinguishing the cis- from the trans-isomer. Recrystallization of the crude material from carbon tetrachloride gave a glycol having a melting point of 102–103° C. The di-p-nitrobenzoate of this glycol had a melting point of 129.7–130.7° C.

*Analysis.*—Calculated for $C_{20}H_{18}O_8N_2$: C, 57.97; H, 4.38; N, 6.76. Found: C, 58.29, H, 4.3; N, 6.58.

Upon evaporation of the water of hydrolysis a near theoretical amount of boric acid was recovered.

EXAMPLE 2

*Preparation of 1,2-dodecyl glycol*

The same reaction as in Example 1 was carried out with dodecene-1 as the olefin, except that the following quantities of reactants were used:

| | Grams | Mols |
|---|---|---|
| Boric Acid | 12.2 | 0.2 |
| Dodecene-1 | 168 | 1.0 |
| 90% CHP | 36 | 0.2 |
| Cyclohexane (as a solvent) | 31.2 | 0.37 |

The reaction was carried out for 5 hours at 85–95° C. During this time 7.8 ml. water was separated. Upon completion of the reaction, the material was filtered and the low boiling fraction stripped off. Analysis indicated that the following constituents were present:

| | Grams |
|---|---|
| Boric Acid [1] | 7.3 |
| Dodecene-1 | 144.7 |
| Cyclohexane and acetone | 50.7 |
| Heavy distillate [2] | 6.9 |
| Bottoms | 32.5 |

[1] By filtration.
[2] Heavy distillate: contains mainly α-methylstyrene and cumyl alcohol.

The bottoms were hydrolyzed with boiling water to give 9.6 grams of crude 1,2-dodecyl glycol (67.6 percent yield). This material, upon recrystallization from chloroform, had a melting point of 59–60° C.

EXAMPLE 3

*Reaction of cumene hydroperoxide and boric acid with 2-ethyl-1-hexene*

The apparatus for this experiment was that of Example 1 less the dropping funnel. To the flask there were charged 67 g. (0.60 mol) of 2-ethyl-1-hexene, 53 g. of 80 percent cumene hydroperoxide (0.30 mol of hydroperoxide), 18.6 g. of boric acid (0.30 mol), and 200 ml. of cyclohexane. This mixture was held at reflux (90° C.) for 15 hours during which time 12.8 ml. (0.70 mol) of water was separated and removed.

The reaction mixture was distilled as previously described. The overhead contained the cyclohexane, unreacted 2-ethyl-1-hexene, 49 g. (0.44 mol, 27 percent conversion), and 3.4 g. of an unknown substance.

The distillation bottoms were hydrolyzed by refluxing with water for 2 hours. The hydrolyzate was extracted with ether and this ether extract distilled. The overhead from this distillation contained 6.86 g. (0.047 mol, 29 percent yield) of glycol calculated as 2-ethyl-1,2-dihydroxyhexane, 8.74 g. (0.093 mol) of phenol, 1.9 g. (0.161 mol) of α-methyl styrene, and 6.0 g. (0.046 mol) of acetophenone. The glycol was purified by a caustic wash followed by chromatography.

The bottoms from the second distillation contained 10.3 g. of an unknown substance.

EXAMPLE 4

*Reaction of t-butyl hydroperoxide and boric acid with α-methyl styrene*

118 g. of α-methyl styrene, 18.6 g. of boric acid, and 25 ml. of benzene were charged to a flask equipped with a stirrer and a water separator. While stirring, the temperature was raised to reflux. 25.5 g. of 70 percent t-butyl hydroperoxide in 65 g. of benzene was added slowly. Reaction was continued for eight hours at refluxing temperature. During this time, 11 cc. of a water layer was taken off. After the eight hours the temperature was permitted to rise from about 80° C. to 123° C. by removing benzene. A peroxide analysis showed 0.4 percent peroxide remaining. The reaction mixture was filtered to remove solids. The remaining organic phase was distilled to remove volatile products having a boiling point up to 140° C. at 1 mm. of mercury. The residue weighed 32.7 g. 10 g. of this residue was hydrolyzed with water by refluxing. The organic phase was extracted with benzene, and the benzene was evaporated. There remained 7.4 g. of product. This material by infra-red analysis showed the presence of mono-substituted aromatics containing glycol and aldehyde arising from the dehydration of the tertiary hydroxyl group of the glycol, followed by rearrangement.

I claim:

1. Process for the preparation of a glycol consisting essentially of heating a mono-olefin of 4 to 16 carbon atoms at a temperature in the range 60–200° C. in the presence of 0.05 to 1.5 mols of boric acid per mol of olefin and of a hydroperoxy compound in proportions of approximately 1 mol per mol of boric acid to form a borate ester, hydrolyzing said ester and recovering the glycol, said hydroperoxy compound being selected from the group consisting of cumene hydroperoxide, decalin hydroperoxide, pinane hydroperoxide, p-menthane hydroperoxide, cymene hydroperoxide and p-chlorocumene hydroperoxide.

2. Process according to claim 1 wherein an inert solvent is used in proportions of 1 to 10 volumes per volume of olefin.

3. Process according to claim 2 wherein the hydroperoxy compound is cumene hydroperoxide.

4. Process according to claim 3 wherein the boric acid is present in an amount of 0.5 to 1.1 mol of olefin.

5. Process according to claim 4, wherein the solvent is cumene.

References Cited by the Examiner

UNITED STATES PATENTS

| 2,507,506 | 5/1950 | Dreisbach et al. | 260—617 |
| 3,076,013 | 1/1963 | Liao et al. | 260—635 |
| 3,089,894 | 5/1963 | Neiswender et al. | 260—462 |

LEON ZITVER, *Primary Examiner.*

LORRAINE A. WEINBERGER, *Examiner.*